(12) United States Patent
Navarro et al.

(10) Patent No.: US 11,599,258 B2
(45) Date of Patent: Mar. 7, 2023

(54) USER INTERFACE FOR SMARTWATCHES AND WEARABLE DEVICES

(71) Applicant: The Toronto-Dominion Bank, Toronto (CA)

(72) Inventors: Miguel Navarro, Ewing, NJ (US); Mohamed Abbas, Jersey City, NJ (US); Robert Setlight, Robbinsville, NJ (US); Nina Angela Kadelski, Sicklerville, NJ (US); Catherine Halloran, Cherry Hill, NJ (US); Joseppina Stankiewicz, Medford, NJ (US); Lina Nancy Siciliano, Voorhees, NJ (US); Richard Bruce Johnson, Cape Elizabeth, ME (US); Levi Sutter, Westhampton, NJ (US); Mathew Hause, Collingswood, NJ (US)

(73) Assignee: The Toronto-Dominion Bank, Toronto (CA)

(*) Notice: Subject to any disclaimer, the term of this patent is extended or adjusted under 35 U.S.C. 154(b) by 91 days.

(21) Appl. No.: 17/178,849

(22) Filed: Feb. 18, 2021

(65) Prior Publication Data

US 2022/0261140 A1    Aug. 18, 2022

(51) Int. Cl.
*G06F 3/04847* (2022.01)
*G06F 3/0486* (2013.01)
*G06F 1/16* (2006.01)

(52) U.S. Cl.
CPC .......... *G06F 3/04847* (2013.01); *G06F 1/163* (2013.01); *G06F 3/0486* (2013.01)

(58) Field of Classification Search
None
See application file for complete search history.

(56) References Cited

U.S. PATENT DOCUMENTS

| | | | |
|---|---|---|---|
| 8,195,313 B1 | 6/2012 | Fadell et al. |
| 8,570,284 B2 | 10/2013 | Rudolph et al. |
| 8,698,405 B2 | 4/2014 | Pezzutti et al. |
| 9,036,855 B2 | 5/2015 | Shah |
| 9,594,493 B2 | 3/2017 | Otero Diaz et al. |
| 10,073,547 B2 | 9/2018 | Seitz et al. |

(Continued)

FOREIGN PATENT DOCUMENTS

WO    2013056914 A1    4/2013

*Primary Examiner* — Stella Higgs
(74) *Attorney, Agent, or Firm* — Rowand LLP (57) ABSTRACT

Methods and devices are provided for receiving, displaying and adjusting user input through a wearable device. An indicated value and an annulus are displayed on a touch-sensitive display of the wearable device. The annulus has a base segment and a highlighted segment. The highlighted segment begins at an origin of the annulus and extends to a first position of the annulus. The size of the highlighted segment corresponds to the indicated value. A first value-adjusting input is received at the touch-sensitive display. The first value-adjusting input includes one or both of a drag operation and a tap operation. The indicated value and the size of the highlighted segment are adjusted in accordance with the first value-adjusting input, such that the proportion of the annulus represented by the highlighted segment corresponds to a proportion of a difference between a base amount and a maximum amount represented by the indicated value.

20 Claims, 8 Drawing Sheets

(56) References Cited

U.S. PATENT DOCUMENTS

| | | | |
|---|---|---|---|
| 2008/0276192 A1* | 11/2008 | Jones | A61B 34/25 715/772 |
| 2012/0280922 A1* | 11/2012 | Lee | G06F 3/04855 345/173 |
| 2015/0205511 A1* | 7/2015 | Vinna | G06F 3/04817 715/716 |
| 2016/0132817 A1* | 5/2016 | Kongot | G06Q 10/063114 705/7.15 |
| 2016/0349859 A1* | 12/2016 | Seitz | G06Q 30/08 |
| 2018/0052428 A1 | 2/2018 | Abramov | |

* cited by examiner

USER INTERFACE FOR SMARTWATCHES AND WEARABLE DEVICES

TECHNICAL FIELD

The present application relates to wearable devices and, in particular, to methods and devices for receiving, displaying and adjusting numerical user input through a wearable device.

BACKGROUND

Wearable devices are becoming more pervasive. The portability and convenience of use of wearable devices make them suitable for various real-time applications, such as activity and health monitoring, media playback, navigation, treatment of sensory impairments, and communications and data synchronization with other electronic devices.

Wearable devices often have integrated components that allow for wireless peer-to-peer communications. For example, a wearable device may be outfitted with an integrated radio-frequency identification (RFID) or near-field communication (NFC) chip and antenna for managing short-range radio-frequency communications. As a result, wearable devices may be configured for many functions traditionally served by mobile devices (for example, smartphones) and payment cards (for example, credit cards, debit cards and smart cards), including contactless payment, proof-of-identity, and social networking. The bandwidth capability of wearable devices is expected to grow as the devices evolve. For example, their connectivity may expand beyond Bluetooth™ tethering connections to include broader bandwidth connectivity such as, for example, 5 G connectivity.

Currently, wearable devices are usually used for receiving short messages and alerts. As such, they do not receive significant user input. For example, user input on a smartwatch may be limited to touch screen selection of inputs and/or to rotating a dial or crown on the smartwatch.

As the functional capabilities of wearables increase, so will the need for additional systems and methods for receiving, displaying, and adjusting user input, such as precise inputs of value. Thus, improvements in the field are desirable.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In a first aspect, the present application describes an electronic device. The electronic device may include a touch-sensitive display, a memory, and a processor in communication with the touch-sensitive display and the memory. The processor may be configured to: display an indicated value and an annulus on the touch-sensitive display, the annulus having a base segment and a highlighted segment, the highlighted segment beginning at an origin of the annulus and extending to a first position of the annulus, the highlighted segment being based on the indicated value; receive a first value-adjusting input at the touch-sensitive display, wherein the first value-adjusting input includes one or both of a drag operation and a tap operation; adjust the indicated value in accordance with the first value-adjusting input; and adjust a size of the highlighted segment of the annulus based on the first value-adjusting input, wherein the proportion of the annulus represented by the highlighted segment corresponds to a proportion of a difference between a base amount and a maximum amount represented by the indicated value.

In some implementations, adjusting the size of the highlighted segment of the annulus based on the first value-adjusting input may include adjusting the size of the highlighted segment of the annulus in proportion to the first-value adjusting input.

In some implementations, the base amount may be zero.

In some implementations, the drag operation may begin at a second position of the annulus and extends partway around the annulus to a third position of the annulus.

In some implementations, the tap operation may include one or more taps, and each tap corresponds to an incremental adjustment of a defined magnitude.

In some implementations, the touch-sensitive display further includes a first section and a second section. Execution of the tap operation upon the first section may correspond to a positive incremental adjustment of magnitude. Execution of the tap operation upon the second section may correspond to a negative incremental adjustment of magnitude.

In some implementations, at least part of the first section and at least part of the second section may be within a centre of the annulus.

In some implementations, the base segment of the annulus may correspond to a first colour. The highlighted segment of the annulus may correspond to a second colour. The maximum amount may be equal to a first maximum value. The processor may be further configured to: detect that the indicated value is greater than or equal to the first maximum value;

in response to detecting that the indicated value is greater than or equal to the first maximum value: change the base segment of the annulus to a third colour; change the highlighted segment of the annulus to a fourth colour; reset the base amount to be equal to the first maximum value; and reset the maximum amount to be equal to twice the first maximum value.

In some implementations the first value-adjusting input may be the drag operation. The drag operation may be used to make broad adjustments to the indicated value. The processor may be further configured to: receive a second value-adjusting input comprising a tap operation in a centre of the annulus, wherein the second value-adjusting input causes the processor to make incremental adjustments to the indicated value.

In some implementations, the electronic device may be a wearable computer.

In some implementations, the electronic device may be a smart watch.

In another aspect, a method is described. The method may be for receiving and displaying user input using an electronic device. The method may include: displaying an indicated value and an annulus on a touch-sensitive display of the electronic device, the annulus having a base segment and a highlighted segment, the highlighted segment beginning at an origin of the annulus and extending to a first position of the annulus, the highlighted segment being based on the indicated value; receiving a first value-adjusting input at the touch-sensitive display, wherein the first value-adjusting input includes one or both of a drag operation and a tap operation; adjusting the indicated value in accordance with the first value-adjusting input; and adjusting a size of the highlighted segment of the annulus based on the first value-adjusting input, wherein the proportion of the annulus represented by the highlighted segment corresponds to a proportion of a difference between a base amount and a maximum amount represented by the indicated value.

In at least some implementations, the base amount may be zero.

In at least some implementations, the drag operation may begin at a second position of the annulus and extend partway around the annulus to a third position of the annulus.

In at least some implementations, the tap operation may include one or more taps. Each tap may correspond to an incremental adjustment of a defined magnitude.

In at least some implementations, the first value-adjusting input may be a tap operation upon a first section on the touch-sensitive display. Adjusting the indicated value in accordance with the first value-adjusting input may include updating the indicated value to reflect a corresponding positive incremental adjustment. Adjusting the size of the highlighted segment of the annulus may include updating the size of the highlighted segment to reflect a corresponding positive incremental adjustment.

In at least some implementations, the method may further include: receiving a second value-adjusting input as a tap operation upon a second section of the touch-sensitive display; updating the size of the highlighted segment to reflect a corresponding negative incremental adjustment; and updating the indicated value to reflect a corresponding negative incremental adjustment.

In at least some implementations, at least part of the first section and at least part of the second section may be within a centre of the annulus.

In at least some implementations, the base segment of the annulus may correspond to a first colour. The highlighted segment of the annulus may correspond to a second colour. The maximum amount may be equal to a first maximum value. The method may further include: detecting that the indicated value is greater than or equal to the first maximum value; and in response to detecting that the indicated value is greater than or equal to the first maximum value: changing the base segment of the annulus to a third colour; changing the highlighted segment of the annulus to a fourth colour; resetting the base amount to be equal to the first maximum value; and resetting the maximum amount to be equal to twice the first maximum value.

In at least some implementations, the first value-adjusting input may be the drag operation. The drag operation may be used to make broad adjustments to the indicated value. The method may further include: receiving a second value-adjusting input comprising a tap operation in a centre of the annulus, wherein the second value-adjusting input causes the electronic device to make incremental adjustments to the indicated value.

In another aspect a computer-readable storage medium is described. The computer-readable storage medium may be a non-transitory computer-readable storage medium. The computer-readable storage medium may have stored thereon instructions which, when executed, configure a processor to perform a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Wearables are electronic technology or devices incorporated into items that can be comfortably worn on a body, such as bands, watches, and glasses. Originally limited to clock functions, message notifications (e.g. text, email, social media), and information tracking (e.g. fitness and sleep tracking), the utility of wearables has grown to include many of the functions previously associated with mobile phones and laptops. Because of the extreme portability and, in some cases, hands-free nature of wearables, this expansion in functionality is welcomed by individuals and by companies.

One of the limitations to the expansion of wearable applications is the user interface. For example, the user interface of a wearable tends to be very small and therefore unsuitable for receiving and displaying detailed information. For example, a keyboard that would be small enough to fit on a wearable display would be too small for a user to use with a finger. As a result, certain transactions requiring the input of large and/or precise values, such as setting a timer, adjusting settings in graphics applications, performing mathematical calculations, and performing financial transactions, have been impractical to implement using a wearable.

To address this limitation, there is a need for systems and methods for receiving, displaying and adjusting numerical user input on a wearable device.

Figure 1:
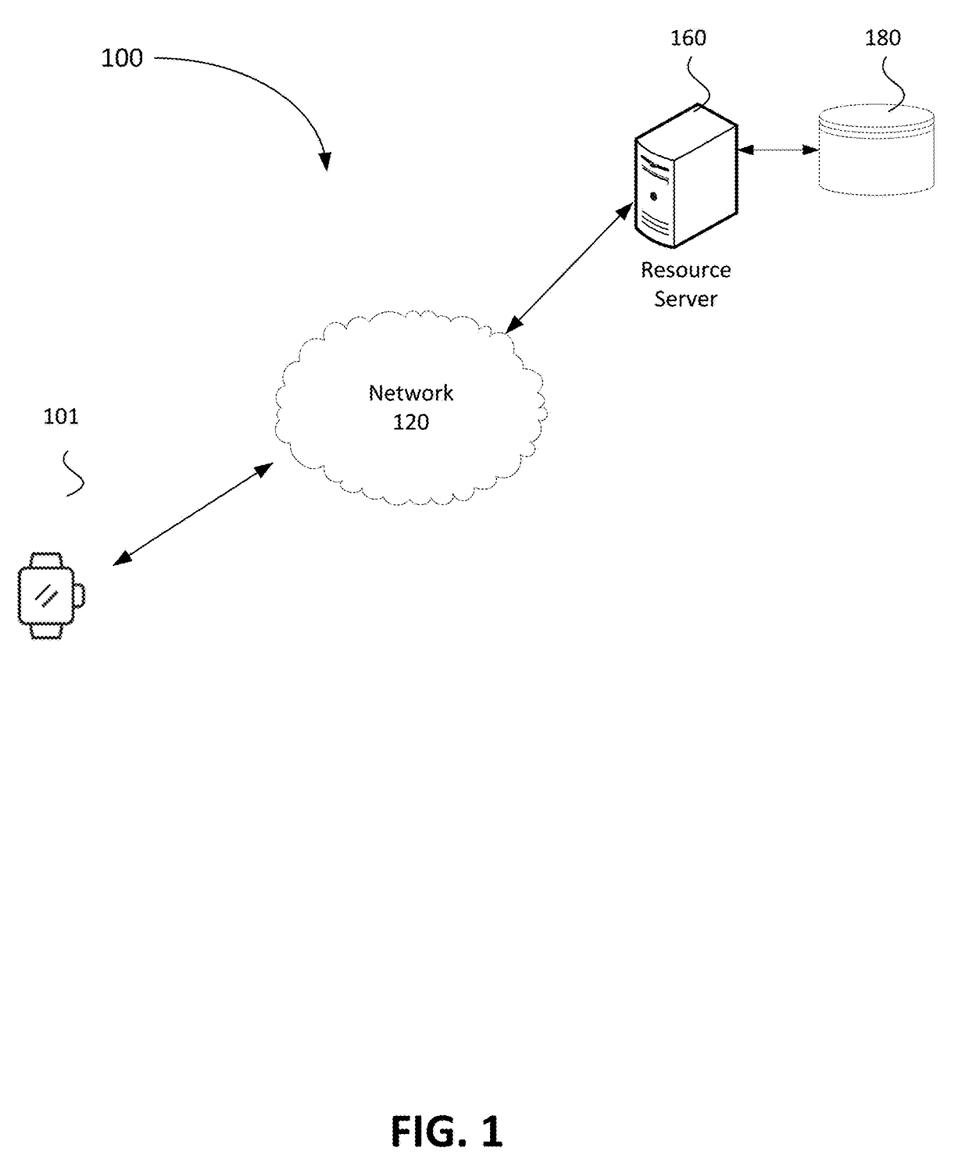
FIG. 1 depicts a schematic diagram illustrating an operating environment of an example embodiment.

FIG. 1 is a schematic diagram illustrating an operating environment of an example embodiment. In particular, FIG. 1 illustrates exemplary components of a system 100 for receiving and displaying user input through a wearable device, in accordance with some embodiments.

As illustrated, a resource server 160 (which may also be referred to as a server computer system) and a wearable device 101 communicate via a network 120. The wearable device 101 is a computing device that is associated with an entity, such as a user or client, having resources that may be associated with the resource server 160. For example, the resource server 160 may send, receive, track, manage, maintain, and/or lend resources to the entity. The resource server 160 may be coupled to a database 180, which may be provided in secure storage. The secure storage may be provided internally within the resource server 160 or externally. The secure storage may, for example, be provided remotely from the resource server 160. For example, the secure storage may include one or more data centers. The data centers may, for example, store data with bank-grade security.

The database 180 may include records for a plurality of accounts and at least some of the records may define a quantity of resources associated with an entity. For example, the entity that is associated with the wearable device 101 may be associated with an account having one or more records in the database. The records may reflect a quantity of stored resources that are associated with the entity. Such resources may include owned resources and, in at least some embodiments, borrowed resources (e.g. resources available on credit). The quantity of resources that are available to or associated with an entity may be reflected by a balance defined in an associated record such as, for example, a bank balance.

The resource server 160 may, for example, be a financial institution server and the entity may be a customer of the financial institution operating the financial institution server.

The wearable device 101 may be used, for example, to configure a data transfer from an account associated with the wearable device 101. More particularly, the wearable device 101 may be used to configure a data transfer from an account associated with an entity operating the client device 101. The data transfer may involve a transfer of data between a record in the database 180 associated with such an account and another record in the database 180 (or in another database such as a database associated with another server (not shown) which may be provided by a different financial institution, for example, and which may be coupled to the resource server 160 via a network). The other record is associated with a data transfer recipient such as, for example, a bill payment recipient. The data involved in the transfer may, for example, be units of value and the records involved in the data transfer may be adjusted in related or corresponding manners. For example, during a data transfer, a record associated with the data transfer recipient may be adjusted to reflect an increase in value due to the transfer, whereas the record associated with the entity initiating the data transfer may be adjusted to reflect a decrease in value which is at least as large as the increase in value applied to the record associated with the data transfer recipient.

The wearable device 101 and the resource server 160 may be in geographically disparate locations. Put differently, the wearable device 101 may be remote from the resource server 160. Both the wearable device 101 and the resource server 160 are computer systems.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

The wearable device 101 may be any electronic device or articles (e.g. garments and accessories) having a wearable form factor. In some embodiments, the wearable device 101 may be or include a smartwatch, fitness and health tracker, glasses, head-mounted display (HMDs), ring, bracelet, sticker/tag, or a garment outfitted with RFID and/or NFC capability.

The wearable device 101 may be owned and operated by a user to conduct a secure operation, which may be, for example, a transactional activity, such as electronic payment, money transfer, or identity verification. The wearable device 101 may be configured for short-range wireless communication, for long-range wireless communication or for both short-range and long-range communication. The wearable device 101 may be communicably coupled to a mobile device. In embodiments wherein the wearable device is not configured for long-range communication, the wearable device may tether to the mobile device in order to make use of the long-range communications ability of the mobile device. The mobile device may be a smartphone, tablet computer, personal digital assistant (PDA), or a computer system.

Figure 2:
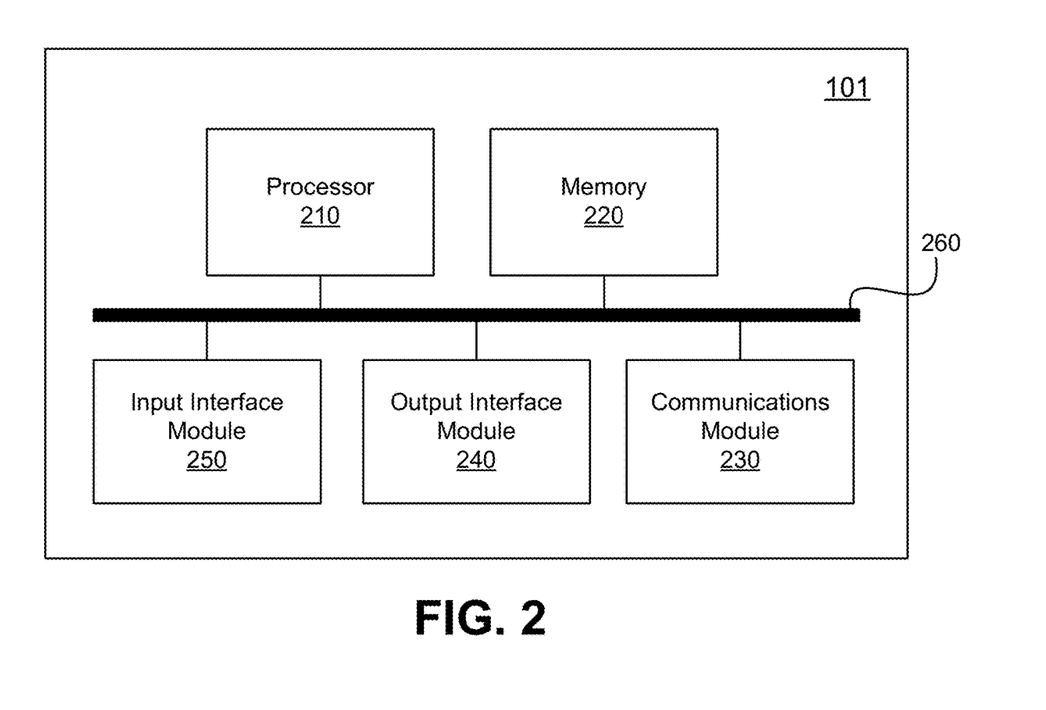
FIG. 2 depicts a high-level operation diagram illustrating an operating environment of an embodiment of an example wearable device.

FIG. 2 is a high-level operation diagram of the wearable device 101. The client mobile device 101 includes a variety of modules. For example, as illustrated, the client mobile device 101 may include a processor 210, a memory 220, a communications module 230, an input interface module 250 and an output interface module 240. As illustrated, the foregoing example modules of the client mobile device 101 are in communication over a bus 260.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the wearable device 101.

The input interface module 250 allows the wearable device 101 to receive input signals. Input signals may, for example, correspond to input received from a user. The input interface module 250 may serve to interconnect the wearable device 101 with one or more input devices. Input signals may be received from input devices by the input interface module 250. Input devices may, for example, include one or more of a touchscreen input, keyboard, trackball, or the like. In some embodiments, all or a portion of the input interface module 250 may be integrated with an input device. For example, the input interface module 250 may be integrated with one of the aforementioned example input devices. In at least some example embodiments, the input devices may be limited function input devices. For example, the input interfaces may exclude a keyboard, a mouse, and/or a trackball. In some implementations, the input interfaces may include a touchscreen that is of limited size. For example, the touchscreen may be less than four square inches in at least some implementations. Due to the restricted size, many input techniques available on larger devices are not possible.

The output interface module 240 allows the wearable device 101 to provide output signals. Some output signals may, for example, allow provision of output to a user. The output interface module 240 may serve to interconnect the wearable device 101 with one or more output devices.

Output signals may be sent to output devices by output interface module 240. Output devices may include, for example, a display screen such as, for example, a liquid crystal display (LCD), a touchscreen display. The output devices may include devices other than screens such as, for example, a speaker, indicator lamps (such as for, example, light-emitting diodes (LEDs)), and printers. In some embodiments, all or a portion of the output interface module 240 may be integrated with an output device. For example, the output interface module 240 may be integrated with one of the aforementioned example output devices.

The communications module 230 allows the wearable device 101 to communicate with other computing devices and/or various communications networks. For example, the communications module 230 may allow the wearable device 101 to send or receive communications signals. Communications signals may be sent or received according to one or more protocols or according to one or more standards. For example, the communications module 230 may allow the wearable device 101 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE), 5G, or the like. Additionally or alternatively, the communications module 230 may allow the wearable device 101 to communicate using NFC, via Wi-Fi, using Bluetooth or via some combination of one or more networks or protocols. In some embodiments, all or a portion of the communications module 230 may be integrated into a component of the wearable device 101. For example, the communications module may be integrated into a communications chipset.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
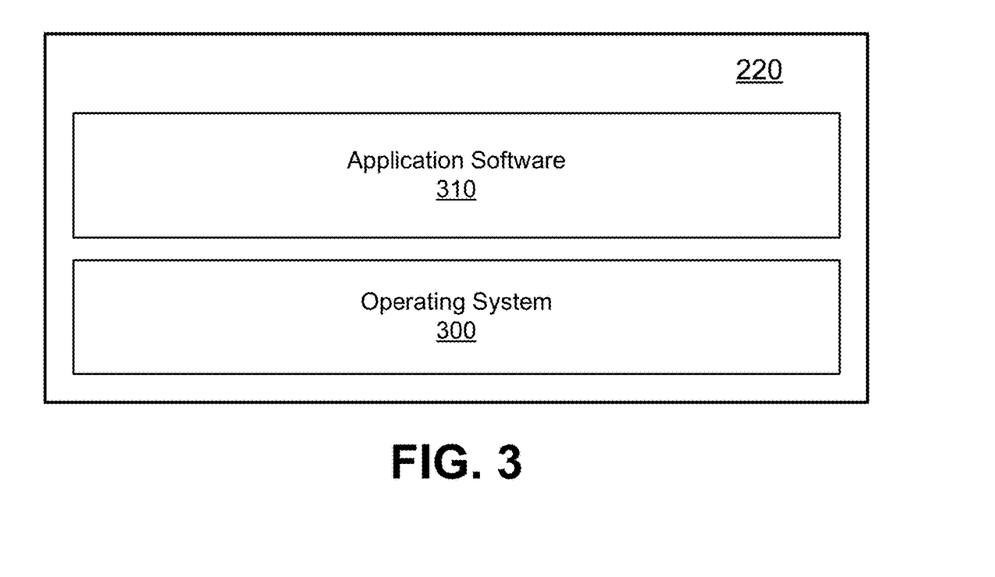
FIG. 3 depicts a simplified organization of software components stored in a memory of the example wearable device of FIG. 2.

FIG. 3 depicts a simplified organization of software components stored in memory 220 of the example wearable device 101. As illustrated, these software components include an operating system 300 and application software 310.

The operating system 300 is software. The operating system 300 allows the application software 310 to access the processor 210, the memory 220, the input interface module 250, the output interface module 240 and the communications module 230. The operating system 300 may be, for example, Apple iOS™, Google Android™, Linux™, Microsoft Windows™, or the like.

The application software 310 adapts the example wearable device 101, in combination with the operating system 300, to operate as a device performing a particular function. The application software 310 may, for example, comprise a resource allocation application. A resource allocation application may be used to define operations, tasks, or objectives associated with the wearable device 101 or a user of the wearable device 101, and to allocate various quantities of resources to the defined operations/tasks/objectives.

Figure 4:
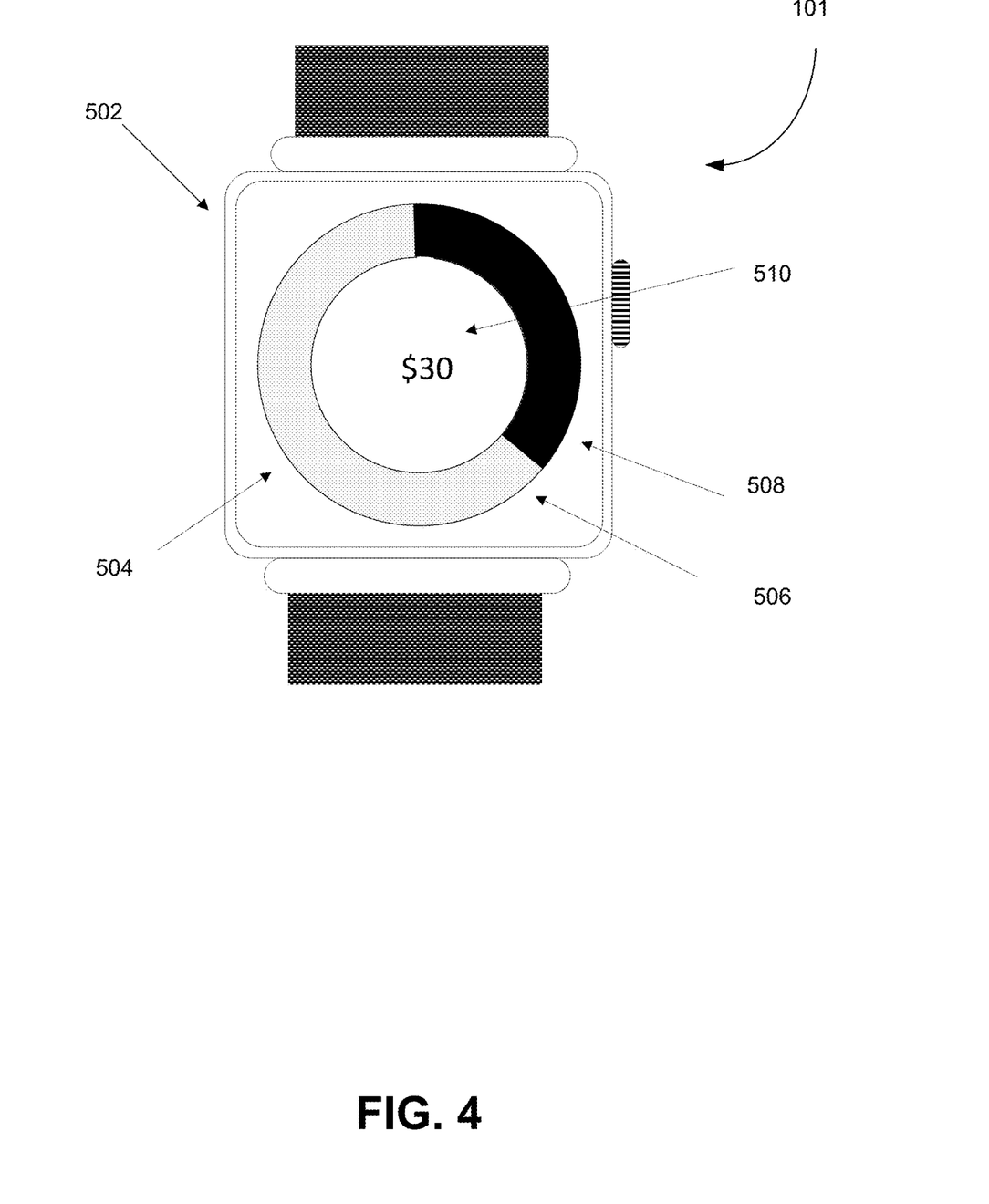
FIG. 4 depicts an example embodiment of a user interface control of a wearable device in accordance with a first aspect described herein.

FIG. 4 illustrates an example embodiment of a user interface control 502 of a wearable device 101 in accordance with a first aspect described herein. The touch-sensitive user interface element 502 may include an annulus 504 having a base segment 506 and a highlighted segment 508. The points along the circumference of the annulus 504 may be associated with values between a base amount and a maximum amount.

The base segment 506 of the annulus and the highlighted segment 508 of the annulus may be displayed with separate visual characteristics such that the base segment 506 is visually distinct from the highlighted segment 508. In at least some implementations, the base segment 506 of the annulus may correspond to a first colour. Put differently, the base segment 506 of the annulus 504 may be displayed in a first colour. The highlighted segment 508 of the annulus may correspond to a second colour distinct from the first colour. Put differently, the highlighted segment 506 of the annulus may be displayed in a second colour such that it is visually distinct from the base segment 506.

An indicated value 510 may be displayed on the user interface control 502. For example, the indicated value 510 may be displayed in the centre of the annulus 504. The indicated value 510 may be of a variety of numerical data types, such as integer, decimal or currency. The indicated value may be modifiable by the user. For example, a user may modify the indicated value using an input interface associated with the wearable device 101.

In some embodiments, a maximum amount may be associated with the user interface control 502. In some implementations, the maximum amount may be displayed on the user interface control 502. The maximum amount may be of a variety of numerical data types, such as integer, decimal or currency, and may correspond to the numerical data type of the indicated value 510. The maximum amount may be fixed or may be adjustable by a user via the wearable device 101 or via an associated application on another computing device. The maximum amount may also be adjustable by another entity, such as a financial institution, who may send and/or receive a communication to a user through the user interface control 502. The maximum amount represents an upper threshold that is associated with the annulus 504, as currently displayed.

The proportion of the maximum amount represented by a current value, such as the indicated value 510, may correspond to the proportion of the annulus 504 that is represented by the highlighted segment 508. That is, the portion of the annulus 504 that is occupied by the highlighted segment 508 may depend on the indicated value 510. If the indicated value 510 is increased through user input, the portion of the annulus 504 occupied by the highlighted segment 508 is also increased and, if the indicated value is decreased through user input, the portion of the annulus that is occupied by the highlighted segment 508 may be decreased accordingly.

In some embodiments, a base amount may be associated with the user interface control 502. The base amount may be displayed on the user interface control 502. The base amount may be of a variety of numerical data types, such as integer, decimal or currency, and may correspond to the numerical data type of the indicated value 510. The base amount may be fixed or may be adjustable by a user via the wearable device 101 or via an associated application on another computing device. The base amount may also be adjustable by another entity, such as a financial institution, who may send and/or receive communication to a user through the user interface control 502. The base amount represents a lower threshold that is associated with the annulus 504, as currently displayed.

The maximum amount and the minimum amount may be associated with one or more regions of the annulus. For example, an origin may be defined for the annulus. The origin may, for example, be associated with an end of the highlighted segment 508. The origin may be associated with the maximum amount and the minimum amount. For example, if the indicated value were reduced such that the indicated value approached the minimum amount, then the highlighted segment 508 would be reduced in the direction of the origin. If the indicated value was set to the minimum amount then the highlighted segment 508 might disappear and might be replaced by a line at the origin. If, instead, the indicated value was increased such that the indicated value approach ed the maximum amount, then amount of the annulus represented by the highlighted segment 508 would be increased. If the indicated value was set to the maximum amount, then the highlighted segment 508 might occupy the entirety of the annulus.

In the embodiment illustrated by FIG. 4, the base amount is $0.00 and the maximum amount is $100.00. As described above, the points along the circumference of the annulus 504 are associated with values between the base amount and the maximum amount. In this example, the indicated value 510 displayed on the user interface control 502 is $30.00. As $30.00 represents ³/₁₀ of $100.00, ³/₁₀ of the annulus 504 is represented by the highlighted segment 508.

Figure 5:
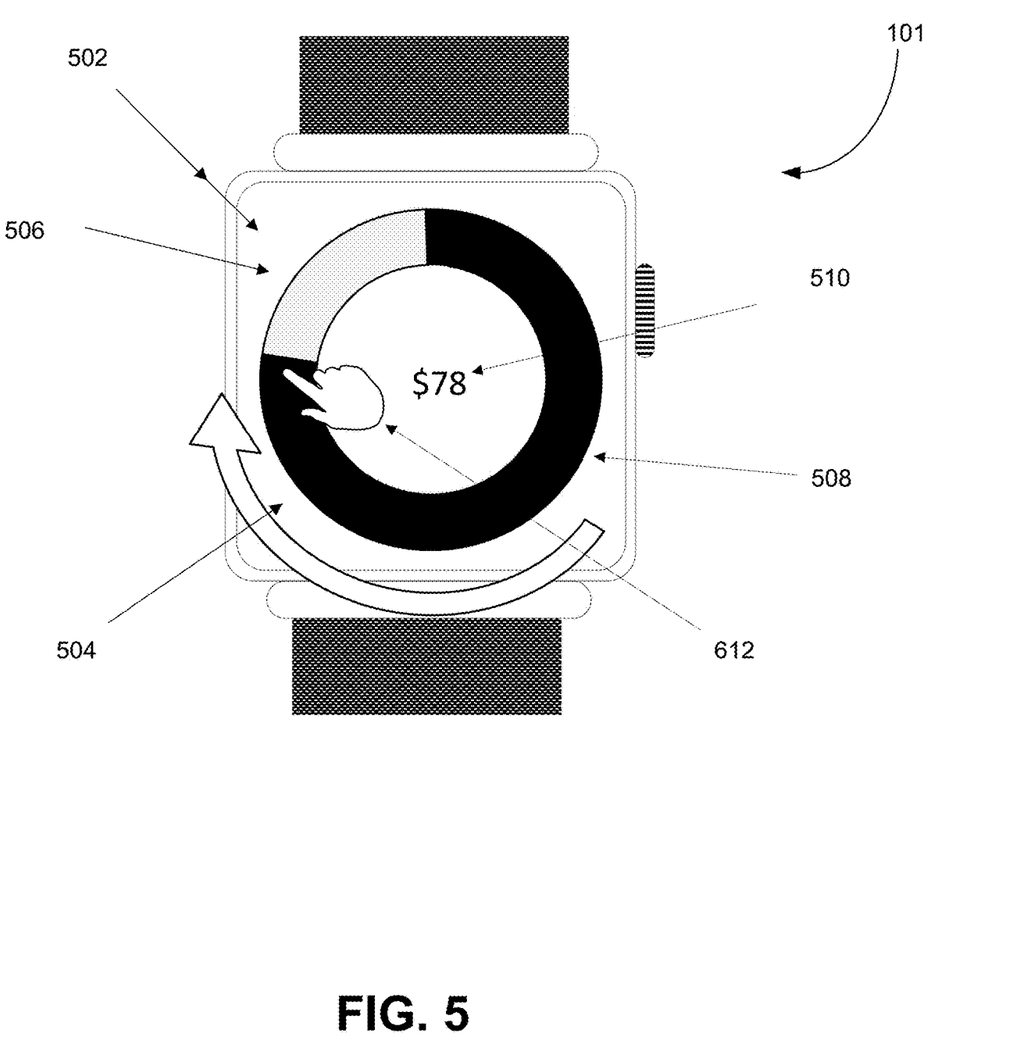
FIG. 5 depicts an example embodiment of a user interface control of a wearable device in accordance with a second aspect described herein.

The indicated value 510 may be modified by a user by means of a value-adjusting input; for example, though a drag operation and/or a tap operation. FIG. 5 illustrates an example modification of the indicated value 510 on wearable device 101 using a drag operation, in accordance with some embodiments. As shown in FIG. 5, a user may effect a drag operation using an instrument 612, for example, a finger or a stylus, to provide touch-screen input to the user interface control 502. As one example, a user may perform a drag operation by touching within the highlighted segment 508 of the annulus 504 and then swiping along the annulus 504 to modify the indicated value 510. The indicated value 510 may be modified to a higher value or to a lower value.

During a drag operation, a preview of the value modification corresponding to the current location of the touch-screen input may be displayed. The preview of the value modification may be displayed via the numerical display of the indicated value 510. The preview of the value modification may, additionally or alternatively, be displayed by a corresponding increase or decrease in the size of the highlighted segment 508. In some embodiments, when a user is satisfied with the value modification represented by the preview, the user may release the touch-screen input. The example of FIG.5 illustrates a drag operation resulting in a previewed value of $78.00.

Figure 6:
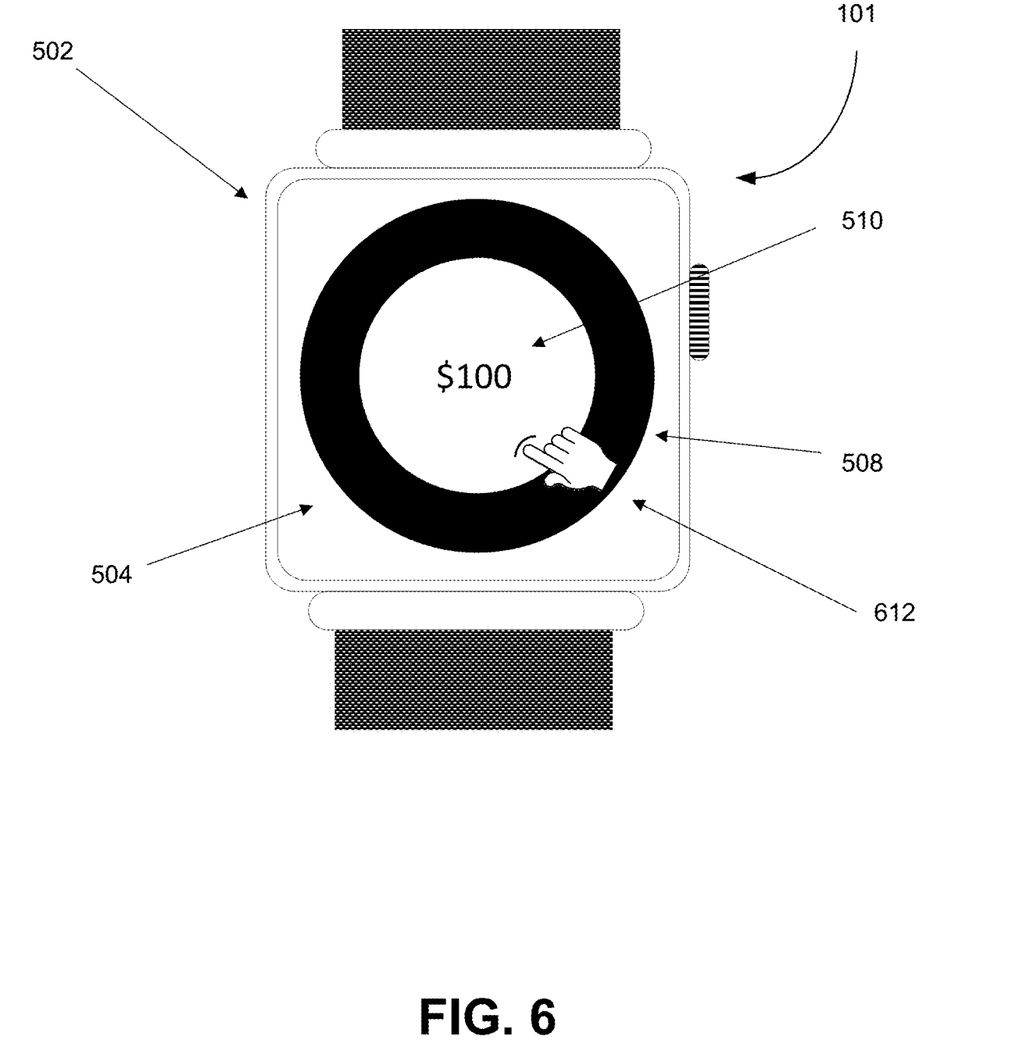
FIG. 6 depicts an example embodiment of a user interface control of a wearable device in accordance with a third aspect described herein.

FIG. 6 illustrates an example wearable device 101 on which an indicated value 510 on may be modified using a tap operation, in accordance with some embodiments. In the example of FIG. 6, the indicated value 510 is equal to a current maximum amount of $100.00. As described above, the proportion of the maximum amount represented by the indicated value 510 may correspond to the proportion of the annulus 504 that is highlighted; therefore, in this example, the highlighted segment 508 comprises the entirety of the annulus 504.

As shown in FIG. 6, a user may use an instrument 612, for example, a finger or a stylus, to provide touch-screen input to the user interface control 502 in order to modify the indicated value 510. For example, the instrument 612 may be used to provide a tap operation. A tap operation may correspond to one or more taps. In some embodiments, each tap may correspond to an incremental increase in value. For example, each tap may correspond to an increase of $1.00. In some embodiments, the magnitude of the increment associated with each tap may be a fixed value. In some embodiments, the magnitude of the increment associated with each tap may be adjustable, for example, by a user via the wearable device 101 or by a user via an associated application on another computing device. In some embodiments, the magnitude may be adjustable by another entity, such as a financial institution, who may send and/or receive communication to a user through the user interface control 502.

In some embodiments, each tap may correspond to an incremental decrease in value. For example, each tap may correspond to a decrease of $5.00. The magnitude of the incremental decrease may or may not be equal to the magnitude of the incremental increase.

In some embodiments, the user interface control 502 may have one or more distinct sections, for example, a first section and a second section. The first section and the second section may, together, occupy the entirety of the user interface control 502. Alternatively, the first section and the second section may occupy part of the user interface control 502, for example, they may comprise the area within the annulus 504.

As an example, the first section may correspond to an upper portion of the user interface control 502 and the second section may correspond to a lower portion of the user interface control 502. As a further example, the first section may correspond to a right-side portion of the user interface control 502 and the second section may correspond to a left-side portion of the user interface control 502.

In another example, one of the first section and the second section may be an area inside the annulus 504 while the other of the first section and the section may be an area outside the annulus 504.

In some embodiments, each tap executed in the first section may correspond to an incremental increase in the indicated value 510, and each tap executed in the second section may correspond to an incremental decrease in the indicated value 510. For example, if the magnitude of both the incremental increase and the incremental decrease is $1.00, five taps in the first section followed by three taps in the second section may result in a net increase of $2.00 to the indicated value 510.

In some implementations, an amount of incremental increase or decrease as the case may be based on a tap duration associated with the tap. The tap duration may be based on a duration of contact with the user interface control 502. For example, the longer the instrument contacts the relevant section (e.g., the first section or the second section), the greater the amount of the incremental change. Put differently, a tap-and-hold may continue to adjust the value until the instrument no longer contacts the user interface control 502.

In some embodiments, a user may choose between value-adjusting input techniques depending on the desired amount and the desired precision of the modification. For example, if the desired amount of the modification is large, it may be expedient to use a drag operation to perform the modification. As another example, if the desired amount of the modification is small and the desired precision of the modification is high, a user may choose to use a tap operation, (i.e., one or more taps), to perform the modification. As another example, if the desired amount of the modification is large and the desired precision of the modification is high, a user may use a combination of both a drag operation and a tap operation. In such situations, a user may first use a drag operation to effect the bulk of the modification, and subsequently use one or more taps to "fine tune" the modification.

In at least some implementations, to allow for such fine-tuning, the amount of adjustment provided by a tap may be small relative to a range associated with the annulus. For example, the amount of adjustment provided by the tap may be small relative to the difference between the maximum amount and the minimum amount of the annulus as presently displayed. By way of example, the amount of adjustment provided by the tap may be less than 5% of the difference between the maximum and the minimum amounts.

In some embodiments, a user may wish to use one or more value-adjusting techniques to increase the indicated value 510 beyond the maximum amount. Once the indicated value 510 has reached the maximum amount, a user may effect a tap operation corresponding to an increase in value. Once the indicated value 510 has reached the maximum amount, a user may use or continue the use of a drag operation to drag the highlighted segment beyond the point of the annulus 504 associated with the maximum amount.

In some implementations, a tap operation may have other functions apart from providing incremental adjustments of the indicated value. For example, in some implementations, a tap operation may be used to adjust a maximum or minimum amount associated with the user interface control 502. For example, the user may tap in a particular section in order to increase (or decrease, as the case may be) a range provided by the annulus. The range may be the difference between the maximum amount and the minimum amount. So, for example, a user may first perform a drag operation to set an indicated value to be near a desired value and they may then perform another operation, such as a tap operation, to change the range of the annulus (i.e., to modify the maximum and/or minimum amounts). For example, the tap operation may reduce the range so that the user is able to better configure the indication value to be the desired value. In at least some implementations, the user interface control 502 may permit the range to be decreased and also increased. For example, a different operation may be used to decrease than would be used to increase the range, or different sections on the user interface control 502 may be used to increase the range and decrease the range. For example, a tap operation may decrease the range while a double tap may decrease the range. By way of further example, a tap operation applied at one section (e.g., inside the annulus) may decrease the range and a tap operation applied at another section (e.g., outside the annulus) may decrease the range.

Conveniently, at least some of the user interface controls 502 described herein may allow for precise input of data on devices having very limited screen capabilities. For example, many smart watches have a display area that only permits an annulus having a circumference of eight (8) centimeters or less to be displayed but such techniques allow for precise input despite such limitations.

Figure 7:
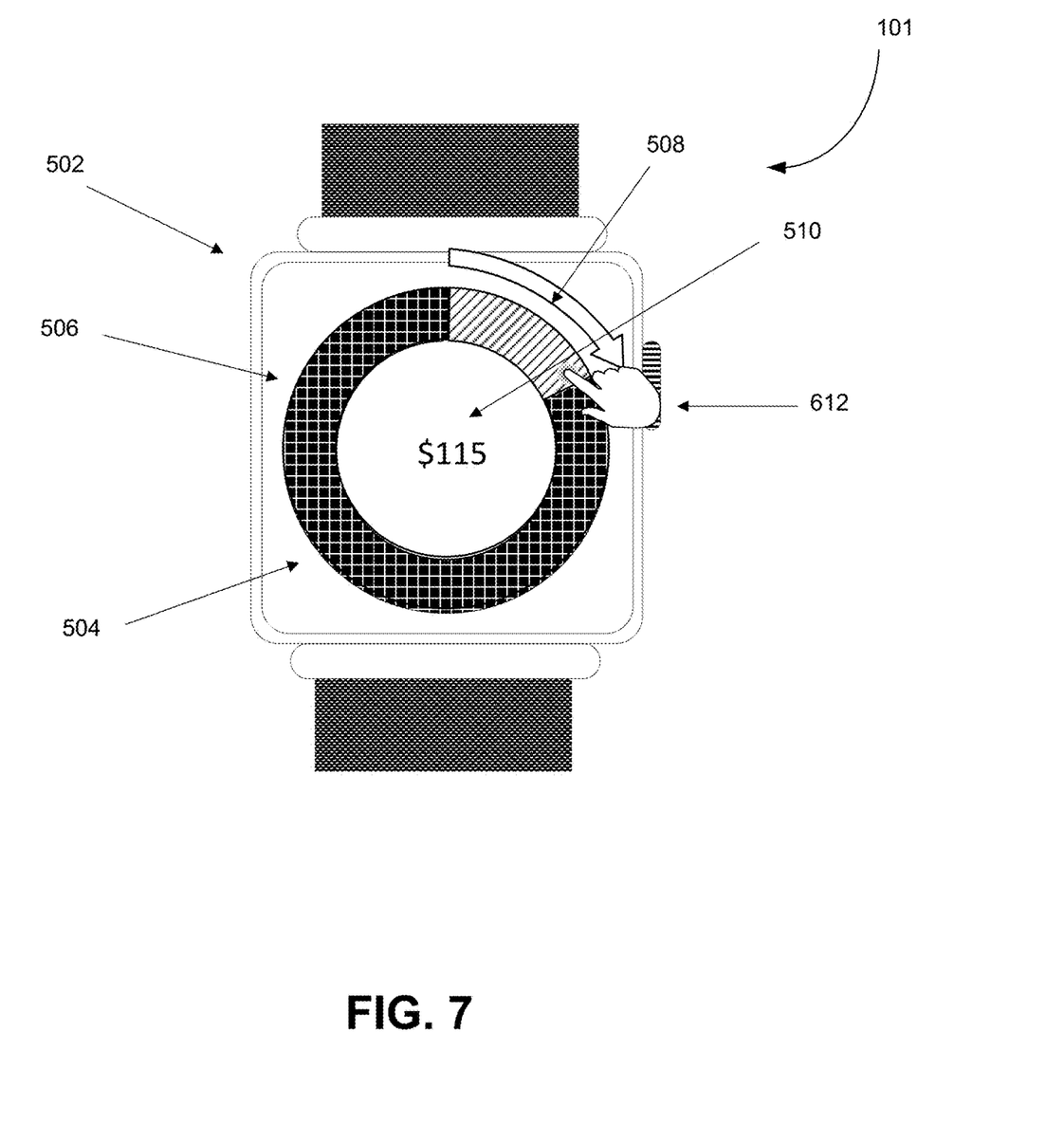
FIG. 7 depicts an example embodiment of a user interface control of a wearable device in accordance with a fourth aspect described herein.

FIG. 7 shows an example of a user using a drag operation to increase the indicated value 510 beyond the maximum amount, in accordance with some embodiments. In the example of FIG. 7, the maximum amount is $100.00. In some embodiments, the passing of the indicated value 510 beyond the maximum amount may be identified by a change in the colour of the base segment 506 of the annulus 504. In some embodiments, the passing of the indicated value 510 beyond the maximum amount may be identified by a change in the colour of the highlighted segment 508 of the annulus 504.

In some embodiments, once the indicated value 510 has reached or surpassed the maximum amount, the user interface control 502 may reset the base amount to a new base amount and may reset the maximum amount to a new maximum amount. The new base amount may be equal to the previous maximum amount to maintain the same numerical range associated with the annulus 504. The new maximum amount may be such that:

new maximum amount=previous maximum+(previous maximum−previous minimum);

In some embodiments, the user interface control 502 may have a distinguishing feature associated with the range (i.e. the difference between the base amount and the maximum amount). For example, in some embodiments, a standard range may be $100.00. In some embodiments, a range greater than the standard range may be associated with a more darkly colored annulus and a range smaller than the standard range may be associated with a more lightly colored annulus.

Figure 8:
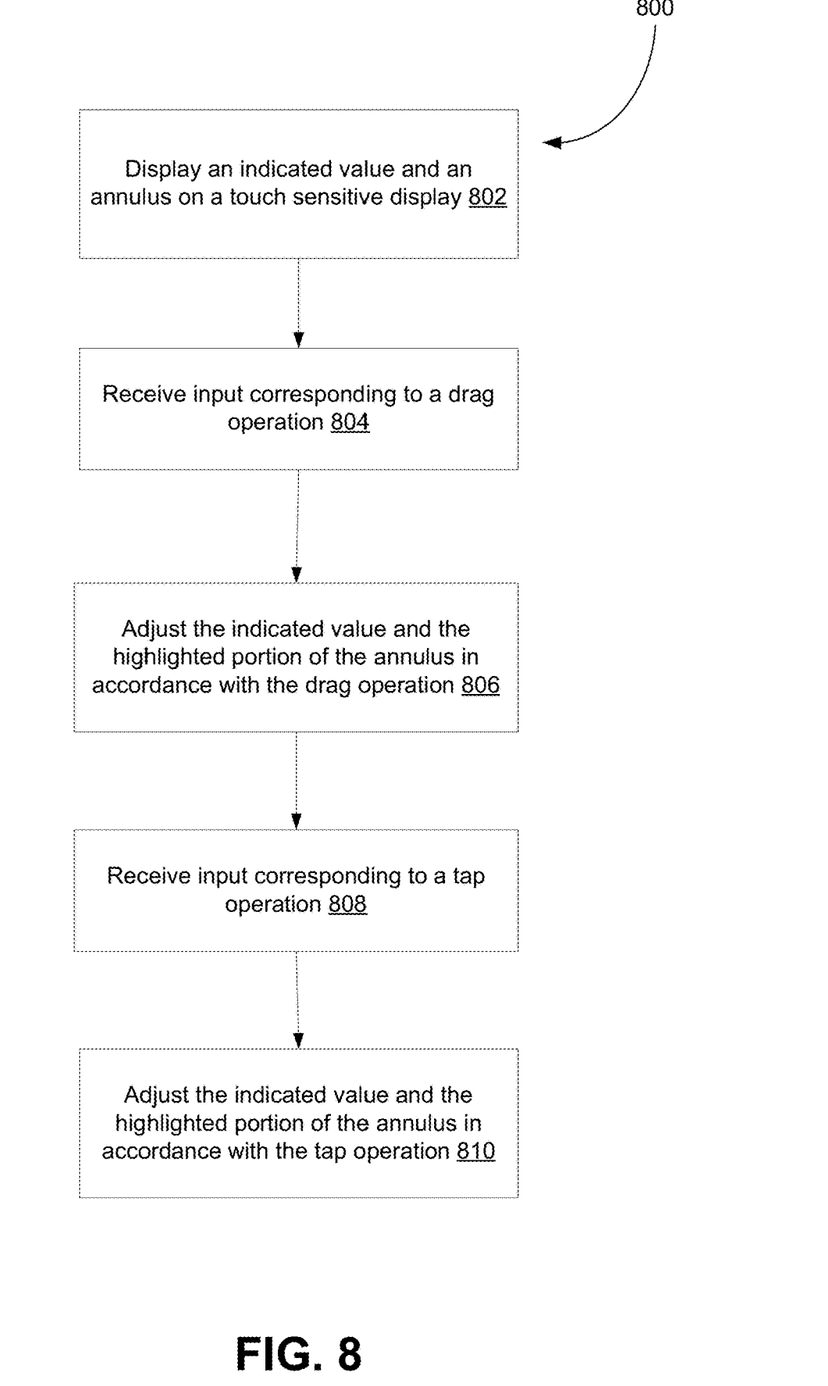
FIG. 8 depicts, in flowchart form, a first example method for receiving and displaying user input through a wearable device.

FIG. 8 is a flowchart showing operations performed by the system 100 in receiving and displaying user input through a wearable device. The operations may be included in a method 800 which may be performed by the system 100. For example, processor-enabled instructions stored in memory of the wearable device 101 and the resource server 160 may, when executed by one or more processors, configure the system 100 to perform the method 800 or a portion thereof. In at least some implementations, processor-executable instructions stored in memory of an electronic device, such as the wearable device, may, when executed, configure the processor to perform the method 800 or a portion thereof. Any operations referred to below as being provided by the system 100 may be performed by an electronic device, such as the wearable device and, more particularly, by a processor of such a device.

At operation 802, an indicated value and an annulus are displayed on a touch sensitive user interface control of a wearable device. The annulus may have a base segment and a highlighted segment, and the highlighted segment may begin at an origin of the annulus and may extend to a first position of the annulus. The points along the circumference of the annulus may be associated with values between a base amount and a maximum amount. The base segment of the annulus and the highlighted segment of the annulus may be displayed so as to be visually distinct. In an implementation, the base segment of the annulus may correspond to a first colour. For example, the base segment of the annulus may be displayed in first colour. The highlighted segment of the annulus may correspond to a second colour distinct from the first colour. That is, the highlighted segment of the annulus may be displayed in the second colour. The indicated value may be displayed on the user interface control, such as the user interface control 502 described above. For example, the indicated value may be displayed in the centre of the annulus. The indicated value may be modifiable through the user interface control and may be of a variety of numerical data types, such as integer, decimal or currency.

In some embodiments, a maximum amount may be displayed on the user interface control. A maximum amount represents a current maximum of a range presently associated with the annulus. The maximum amount may be of a variety of numerical data types, such as integer, decimal or currency, and may correspond to the numerical data type of the indicated value. The maximum amount may be fixed or may be adjustable by a user via the wearable device or via an associated application on another computing device. The maximum amount may also be adjustable by another entity, such as a financial institution, who may send and/or receive communication to a user through the user interface control.

The proportion of the maximum amount represented by the indicated value may correspond to the proportion of the annulus that is represented by the highlighted segment.

The displayed user interface control may be used to receive a value-adjusting input which may be used to adjust a value that is to be provided as input to the wearable device. To do so, the method 800 may include an operation in which a first value-adjusting input is received at the touch-sensitive display. The first value-adjusting input may be a drag operation, a tap operation, or both. In the example, embodiment of FIG. 8, a drag operation is performed as a first value-adjusting input. The drag operation may be performed as the first value-adjusting input in order to effect the bulk of the desired modification to the indicated value. At operation 804, the system 100, through the user interface control, receives input corresponding to a drag operation. A user may effect a drag operation using an instrument, for example, a finger or a stylus, to provide touch-screen input to the user interface control. In some embodiments, a user may perform a drag operation by touching within the highlighted segment of the annulus and then swiping along the annulus to a second position of the annulus. Put differently, the drag operation may begin at a position of the annulus and extend to another position of the annulus.

The system 100 adjusts the highlighted segment of the annulus based on the first-value adjusting input. For example, the electronic device may adjust the size of the highlighting segment of the annulus in proportion to the first value adjusting input. In the case of a drag operation, the adjustment to the highlighted segment may be greater if a magnitude associated with the drag operation is greater. For example, a longer drag operation may result in a greater adjustment than a shorter drag operation. Thus, the amount of the annulus contacted during the drag operation may affect the amount of the adjustment.

The system 100 may also adjust the indicated value in accordance with the first value-adjusting input. The proportion of the annulus that is represented by the highlighted segment may correspond to a proportion of a difference between a base amount and a maximum amount represented by the indicated value. The base amount and maximum amount represent a current range of the annulus. In some instances, the base amount may be zero.

In the illustrated example, at operation 806, the system 100 adjusts the highlighted segment of the annulus and the indicated value in accordance with the drag operation. For example, the system 100 may adjust the display such that the highlighted segment extends from the origin to the second position of the annulus. The system 100 may also simultaneously update the indicated value to correspond to the value represented by the highlighted segment of the annulus. The indicated value may represent a value that is to be provided to the wearable device as input. By way of example, the indicated value may be a monetary quantum. The monetary quantum may be an amount of money that is to, for example, be transferred from a user of the wearable device.

In some embodiments, a user may perform a second value-adjusting input in order to "fine tune" the indicated value. The second value-adjusting input may be a different type of input than the first value-adjusting input. For example, the second value-adjusting input may in some implementations be a tap operation. In some implementations, the drag operation may be used to make broad adjustments to the indicated value and the tap operation may be used to make incremental adjustments to the indicated value.

At operation 808, the system 100 receives one or more taps via an instrument, for example, a finger or a stylus. A tap operation may correspond to one or more taps. A tap may each tap corresponds to an incremental adjustment, which may be of a defined magnitude. For example, one or more of the taps may each correspond to an incremental increase in value. That is, the system 100 may perform a positive incremental adjustment of magnitude responsive to receiving the tap. In doing so, the system 100 may adjust the indicated value. The system may also adjust the highlighted segment of the annulus.

By way of further example, one or more of the taps may each correspond to an incremental decrease in value. That is, the system 100 may perform a negative incremental adjustment of magnitude responsive to receiving the tap. In doing so, the system 100 may adjust the indicated value. The system may also adjust the highlighted segment of the annulus.

The system may determine whether the adjustment is to be one that increases the indicated value (and thus the highlighted segment) or one that decreases the indicated value (and thus the highlighted segment) based on defined criteria. For example, in some implementations, the touch-sensitive display may include a first section and a second section. Execution of the tap operation upon the first section may correspond to a positive incremental adjustment of magnitude and an execution of the tap operation upon the second section may correspond to a negative incremental adjustment of magnitude. That is, a tap at one location may increase the indicated value whereas a tap at another location may decrease the indicated value. In some instances both tap locations (i.e., the location that increases the indicated value and the location that decreases the indicated value) are within a centre of the annulus. In other implementations, one of the locations may be enclosed by the annulus and another may be outside of the perimeter of the annulus.

Accordingly, in some implementations, the second value-adjusting input may be received at a centre of the annulus and the second value-adjusting input may cause the processor to make incremental adjustments to the indicated value.

In some embodiments, the magnitude of the increment associated with each tap may be a fixed value. In some embodiments, the magnitude of the increment associated with each tap may be adjustable, for example, by a user via the wearable device or by a user via an associated application on another computing device. In some embodiments, the magnitude may be adjustable by another entity, such as a financial institution, who may send and/or receive communication to a user through the user interface control.

At operation 810, the system 100 adjusts the highlighted segment and the indicated value in accordance with the tap operation. For example, if one tap corresponds to an incremental increase of $1.00 and the user interface control receives two taps, the user interface control may increase the indicated value by $2.00. The system 100 may also simultaneously increase the size of the highlighted segment of the annulus in proportion to the increase in the indicated value.

The method 800 may include other features as generally described herein. For example, the method 800 may provide a user interface control 502 having features as generally described herein.

Figure 9:
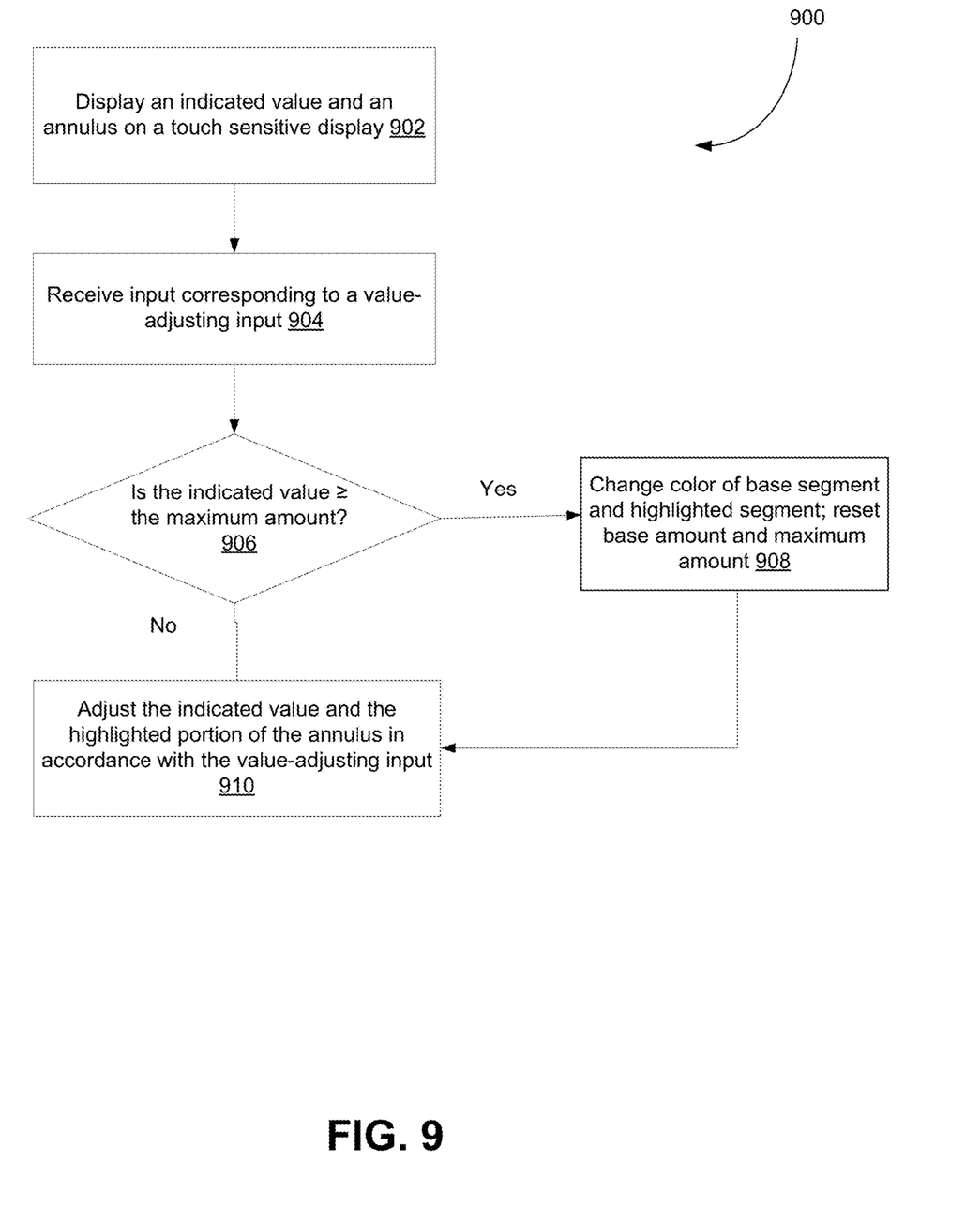
FIG. 9 depicts, in flowchart form, a second example method for receiving and displaying user input through a wearable device.

FIG. 9 is a flowchart showing operations performed by the system 100 in receiving and displaying user input through a wearable device. The operations may be included in a method 900 which may be performed by the system 100. For example, processor-enabled instructions stored in memory of the wearable device 101 and the resource server 160 may, when executed by one or more processors, configure the system 100 to perform the method 900 or a portion thereof. In at least some implementations, processor-executable instructions stored in memory of an electronic device, such as the wearable device, may, when executed, configure the processor to perform the method 900 or a portion thereof. Any operations referred to below as being provided by the system 100 may be performed by an electronic device, such as the wearable device and, more particularly, by a processor of such a device.

At operation 902, an indicated value and an annulus are displayed on a touch sensitive user interface control of a wearable device. The annulus may have a base segment and a highlighted segment, and the highlighted segment may begin at an origin of the annulus and may extend to a first position of the annulus. The points along the circumference of the annulus may be associated with values between a base amount and a maximum amount. The base segment of the annulus may correspond to a first colour. That is, the base segment of the annulus may be depicted in a first colour.

The highlighted segment of the annulus may correspond to a second colour distinct from the first colour. That is, the highlighted segment may be displayed in the second colour. The indicated value may be displayed on the user interface control, for example, the indicated value may be displayed in the centre of the annulus. The indicated value may be modifiable through the user interface control and may be of a variety of numerical data types, such as integer, decimal or currency.

As noted previously, the annulus may be associated with a range defined by a base amount and a maximum amount. In some embodiments, the maximum amount may be displayed on the user interface control. The maximum amount may be of a variety of numerical data types, such as integer, decimal or currency, and may correspond to the numerical data type of the indicated value. The maximum amount may be fixed or may be adjustable by a user via the wearable device or via an associated application on another computing device. The maximum amount may also be adjustable by another entity, such as a financial institution, who may send and/or receive communication to a user through the user interface control. In some embodiments, the proportion of the maximum amount represented by the indicated value may correspond to the proportion of the annulus that is represented by the highlighted segment. In some embodiments, the proportion of the difference between the maximum amount and the base amount may correspond to the proportion of the annulus that is represented by the highlighted segment.

In some embodiments, the base amount may be displayed on the user interface control. The base amount may be of a variety of numerical data types, such as integer, decimal or currency, and may correspond to the numerical data type of the indicated value. The base amount may be fixed or may be adjustable by a user via the wearable device or via an associated application on another computing device. The base amount may also be adjustable by another entity, such as a financial institution, who may send and/or receive communication to a user through the user interface control.

During operation 902, the annulus may have a maximum amount that is equal to a first maximum value.

At operation 904, the system 100, through the user interface control, receives input corresponding to a value-adjusting input. A user may effect the value-adjusting input using an instrument, for example, a finger or a stylus, to provide touch-screen input to the user interface control. In some embodiments, the value-adjusting input may comprise a drag operation. For example, a user may perform a drag operation by touching within the highlighted segment of the annulus and then swiping along the annulus to a second position of the annulus. In some embodiments, the value-adjusting input may comprise a tap operation. For example, a user may perform a tap operation comprising one or more taps. In accordance with one aspect of the present application, at operation 906, the system 100 may determine whether the value-adjusting input defines an indicated value that is greater than or equal to the maximum amount.

In some embodiments, when the system 100 determines that the value-adjusting input defines an indicated value that is not greater than or equal to the maximum amount, the method 900 continues to operation 910. In some embodiments, when the system 100 determines that the value-adjusting input defines an indicated value that is greater than or equal to the maximum amount, the method 900 continues to operation 908.

At operation 908, the system 100 may change the base segment of the annulus from a first color to a third colour. Additionally or alternatively, the system may change the highlighted segment of the annulus from a second colour to a fourth colour. More generally, the annulus may be adjusted to visually indicate through the use of colour or another fill technique, that a range associated with the annulus has changed. In some implementation, the change of colour that is used to indicate the new range may be a change from one colour group or broad colour category to another (e.g. red to blue). In other implementations, the change of colour may be more subtle. For example, as the maximum value increases, a shade may be darkened to visually depict the change.

In accordance with some embodiments, the system may reset the base amount to be equal to the first maximum value and may reset the maximum amount to be equal to twice the first maximum value. The system 100 may then proceed to operation 910.

At operation 910, the system 100 adjusts the indicated value and the highlighted portion of the annulus in accordance with the value-adjusting input.

The method 900 may include other features as generally described herein. For example, the method 900 may provide a user interface control 502 having features as generally described herein.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. An electronic device, comprising:
    a touch-sensitive display;

a memory; and a processor in communication with the touch-sensitive display and the memory, wherein the processor is configured to:

display an indicated value and an annulus on the touch-sensitive display, the annulus having a base segment and a highlighted segment, the highlighted segment beginning at an origin of the annulus and extending to a first position along of the annulus, wherein points along a circumference of the annulus are associated with values between a base amount and a maximum amount and wherein the highlighted segment is based on the indicated value;

receive a first value-adjusting input at the touch-sensitive display, the first value-adjusting input comprising a drag operation;

adjust the indicated value in accordance with the first value-adjusting input;

adjust a size of the highlighted segment based on the first value-adjusting input, wherein the proportion of the annulus represented by the highlighted segment corresponds to a proportion of a range of the annulus represented by the indicated value, the range being a difference between the base amount and the maximum amount;

receive a second value-adjusting input at the touch-sensitive display, the second value-adjusting input comprising a tap operation; and in response to receiving the second value-adjusting input, adjust at least one of the base amount or the maximum amount for causing the range of the annulus to be decreased.

2. The electronic device of claim 1, wherein adjusting the size of the highlighted segment of the annulus based on the first value-adjusting input comprises adjusting the size of the highlighted segment of the annulus in proportion to the first-value adjusting input.

3. The electronic device of claim 1, wherein the base amount is zero.

4. The electronic device of claim 1, wherein the drag operation begins at a second position of the annulus and extends partway around the annulus to a third position of the annulus.

5. The electronic device of claim 1, wherein the tap operation comprises one or more taps, and each tap corresponds to an incremental adjustment of a defined magnitude.

6. The electronic device of claim 5, wherein the touch-sensitive display further comprises:

a first section; and a second section, and wherein an execution of the tap operation upon the first section corresponds to a positive incremental adjustment of magnitude and wherein an execution of the tap operation upon the second section corresponds to a negative incremental adjustment of magnitude.

7. The electronic device of claim 6, wherein at least part of the first section and at least part of the second section are within a centre of the annulus.

8. The electronic device of claim 1, wherein the base segment of the annulus corresponds to a first colour;

wherein the highlighted segment of the annulus corresponds to a second colour;

wherein the maximum amount is equal to a first maximum value; and wherein the processor is further configured to:

detect that the indicated value is greater than or equal to the first maximum value;

in response to detecting that the indicated value is greater than or equal to the first maximum value:

change the base segment of the annulus to a third colour;

change the highlighted segment of the annulus to a fourth colour;

reset the base amount to be equal to the first maximum value; and reset the maximum amount to be equal to twice the first maximum value.

9. The electronic device of claim 1, wherein the drag operation is used to make broad adjustments to the indicated value and wherein the processor is configured to:

receive further tap inputs in a centre of the annulus, wherein the further tap inputs causes the processor to make incremental adjustments to the indicated value.

10. The electronic device of claim 1 wherein the electronic device is a wearable computer.

11. The electronic device of claim 1 wherein the electronic device is a smart watch.

12. A method for receiving and displaying user input using an electronic device, the method comprising:

displaying an indicated value and an annulus on a touch-sensitive display of the electronic device, the annulus having a base segment and a highlighted segment, the highlighted segment beginning at an origin of the annulus and extending to a first position along the annulus, wherein points along a circumference of the annulus are associated with values between a base amount and a maximum amount and wherein the highlighted segment is based on the indicated value;

receiving a first value-adjusting input at the touch-sensitive display, the first value-adjusting input comprising a drag operation;

adjusting the indicated value in accordance with the first value-adjusting input;

adjusting a size of the highlighted segment based on the first value-adjusting input, wherein the proportion of the annulus represented by the highlighted segment corresponds to a proportion of a range of the annulus represented by the indicated value, the range being a difference between a base amount and a maximum amount;

receiving a second value-adjusting input at the touch-sensitive display, the second value-adjusting input comprising a tap operation; and in response to receiving the second value-adjusting input, adjust at least one of the base amount or the maximum amount for causing the range of the annulus to be decreased.

13. The method of claim 12, wherein the base amount is zero.

14. The method of claim 12, wherein the drag operation begins at a second position of the annulus and extends partway around the annulus to a third position of the annulus.

15. The method of claim 12, wherein the tap operation comprises one or more taps, and each tap corresponds to an incremental adjustment of a defined magnitude.

16. The method of claim 15, wherein the first value-adjusting input is a tap operation upon a first section on the touch-sensitive display, and wherein adjusting the indicated value in accordance with the first value-adjusting input comprises updating the indicated value to reflect a corresponding positive incremental adjustment and wherein adjusting the size of the highlighted segment of the annulus comprises updating the size of the highlighted segment to reflect a corresponding positive incremental adjustment.

17. The method of claim 16, further comprising:
receiving a second value-adjusting input as a tap operation upon a second section of the touch-sensitive display;
updating the size of the highlighted segment to reflect a corresponding negative incremental adjustment; and
updating the indicated value to reflect a corresponding negative incremental adjustment.

18. The method of claim 16, wherein at least part of the first section and at least part of the second section are within a centre of the annulus.

19. The method of claim 12,
wherein the base segment of the annulus corresponds to a first colour;
wherein the highlighted segment of the annulus corresponds to a second colour;
wherein the maximum amount is equal to a first maximum value;
wherein the method further comprises detecting that the indicated value is greater than or equal to the first maximum value; and
in response to detecting that the indicated value is greater than or equal to the first maximum value:
changing the base segment of the annulus to a third colour;
changing the highlighted segment of the annulus to a fourth colour;
resetting the base amount to be equal to the first maximum value; and
resetting the maximum amount to be equal to twice the first maximum value.

20. The method of claim 12, further comprising receiving further tap inputs in a centre of the annulus,
wherein the drag operation is used to make broad adjustments to the indicated value,
and wherein the further tap inputs cause the electronic device to make incremental adjustments to the indicated value.

* * * * *